United States Patent [19]

Huff

[11] 4,112,962

[45] Sep. 12, 1978

[54] INTEGRATED PNEUMATIC LOGIC MODULE

[76] Inventor: Peter C. Huff, 6530 Dartbrook, Dallas, Tex. 75240

[21] Appl. No.: 649,646

[22] Filed: Jan. 16, 1976

[51] Int. Cl.² .................................................. F15B 13/07
[52] U.S. Cl. ..................................... 137/119; 137/112; 137/552; 137/556; 137/624.14; 137/624.18
[58] Field of Search ............ 137/119, 552, 556, 624.14, 137/624.18; 235/201 ME

[56] References Cited

U.S. PATENT DOCUMENTS

| | | | |
|---|---|---|---|
| 3,618,636 | 11/1971 | Grimland et al. | 137/556 X |
| 3,875,959 | 4/1975 | Bouteille | 137/119 |
| 3,881,512 | 5/1975 | Wilke | 137/596.13 |

*Primary Examiner*—Gerald A. Michalsky
*Attorney, Agent, or Firm*—Hubbard, Thurman, Turner, Tucker & Glaser

[57] ABSTRACT

A pneumatic logic control module is disclosed which includes three miniaturized, piloted, detented relay valves mounted on a pneumatic circuit board including a valve mounting plate, a circuit plate having routed flow paths formed in each face, and a connector plate having barbed ports for receiving flexible tubes. The pneumatic circuit interconnects the relay valves so that the relay valves are shifted from a normal position to an active position and locks to the normal position in a predetermined sequence to produce a series of pneumatic pressure signals. The module produces a first pneumatic pressure signal in response to a start signal which is used to initiate a first event. A return verification signal indicating that the first event has been completed terminates the first pressure signal, and initiates a second pressure signal which starts a second event. A second return verification pressure signal indicating that the second event has been completed terminates the second event pressure signal and initiates a third pressure signal. The circuit is designed to prevent any subsequent event, including a relay valve shift, from occurring before positive verification that all preceeding events have occurred. Any or all relay valves can be reset to the normal position, or any one relay valve can be preset to the active position so that the automatic sequence can be initiated at any desired event. The module has all ports necessary to permit any number of modules to be cascaded in series, in parallel, in combinations of series and parallel circuits, or in nested loops to provide complete flexibility in designing a pneumatic logic circuit. Limit valves, time delays, proximity and temperature sensors, and other devices may be used in the verification circuit. A unique circuit board assembly is also disclosed which utilizes a simplified shuttle valve structure.

11 Claims, 10 Drawing Figures

INTEGRATED PNEUMATIC LOGIC MODULE

The present invention relates to pneumatic logic control circuits for apparatus having a number of sequential operations or events such as pneumatically or hydraulically powered automated equipment, and more particularly relates to a basic pneumatic module which can be easily used in various combinations to form such sequential control systems.

Automatic control systems for machinery typically require that a predetermined sequence of events be performed by fluid powered components of the systems. Electrical and electronic control systems, including digital computers, have been used extensively for controlling such automatic machinery and equipment. While electrical systems have many advantages, there are many applications where electrically powered systems cannot be used for safety or other reasons. Fluidic systems which utilize diversion of a fluid stream to perform logic functions have been proposed for situations where electrical systems are not wholly satisfactory. In more recent times, pneumatic logic components such as relay valves, limit switches and the like have been developed and are being used to an increasing extent. However, the design, assembly and maintenance of this circuit is expensive and has heretofore been a deterrent to full realization of the potential advantages of pneumatic systems.

The present invention is concerned with a pneumatic logic module which provides a basic sequential control function which is highly versatile and greatly simplifies the design of pneumatic logic control systems. The module of the present invention provides sequentially a first event pressure signal in response to a start signal which may be used to initiate a first machine function or event. When the module receives a verification signal from the machine indicating that the event has been completed, the first event pressure signal is terminated and a second event pressure signal produced. When a second verification signal is received by the module indicating that the second event has been completed, the second event is terminated. The initiation of each event occurs only after a verification that the preceeding event signal has been terminated by the module.

In the preferred form of the invention, the module includes means for sequentially producing pressure signals on three separate ports. Further, ports are provided for turning off a preceeding module and for initiating a subsequent module with the same type verification that the events have occurred and that the relay valves have in fact properly switched so that the system is "fail safe."

The invention contemplates in a more specific embodiment, a module containing three detented relay valves interconnected in such a manner as to perform the above functions by a pneumatic circuit formed by three sandwiched plates. The module has the added function of providing a reset capability as a result of unique shuttle valves formed in the pneumatic circuit, and a capability of being preset to any selected event by an external shuttle valve. The module is designed to ensure that only one relay, and only one event, can be active at any time. The circuit has the capability of being selectively initiated at any event in the series of events, of being utilized as a single unit with minimum waste of components, or cascaded in series with any number of modules and in parallel with any number of modules, or in a combination of series and parallel circuits. Each event can also function as a timing control, or with a timed delay either before or after initiation of a given event. Further, the module has the capability of terminating its own sequence. Any event can be easily bypassed without producing a possible race condition. Further, since only one relay valve can be active at any time in a sequence, the logic system can be quickly and easily de-bugged by reason of visual indicators provided in connection with each relay.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
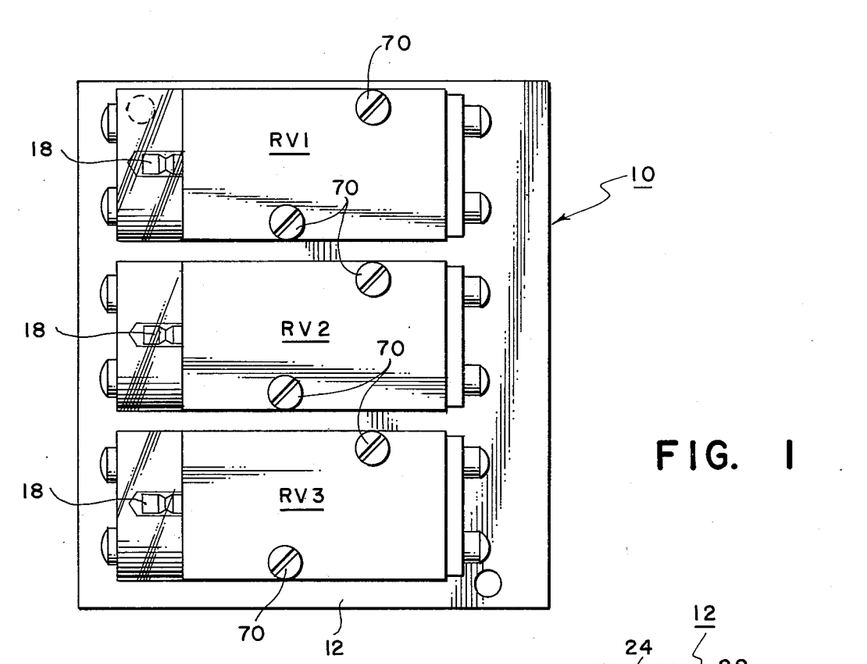
FIG. 1 is front top view of a pneumatic logic module in accordance with the present invention.
Figure 2:
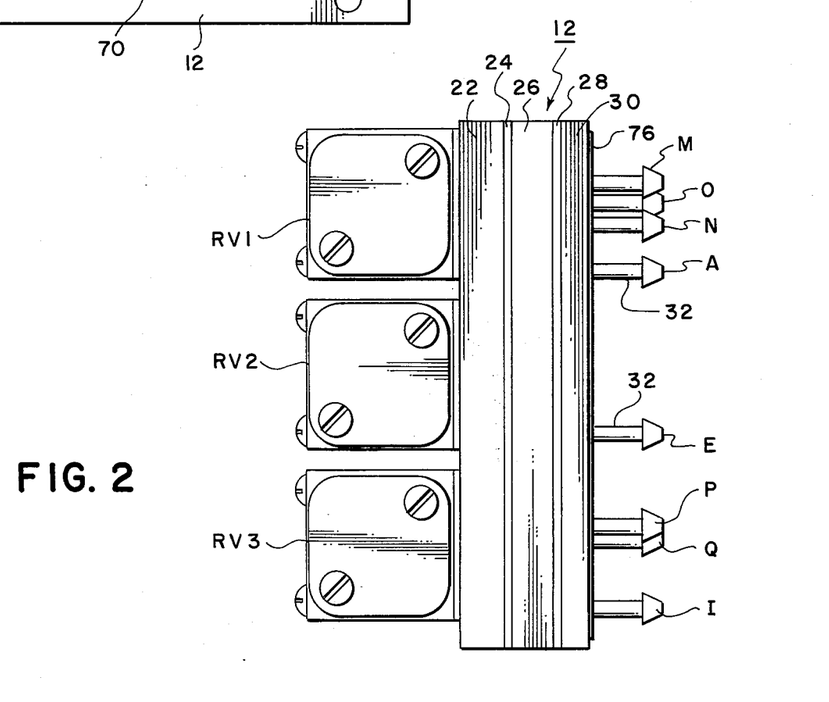
FIG. 2 is a side view of the module of FIG. 1.
Figure 3:
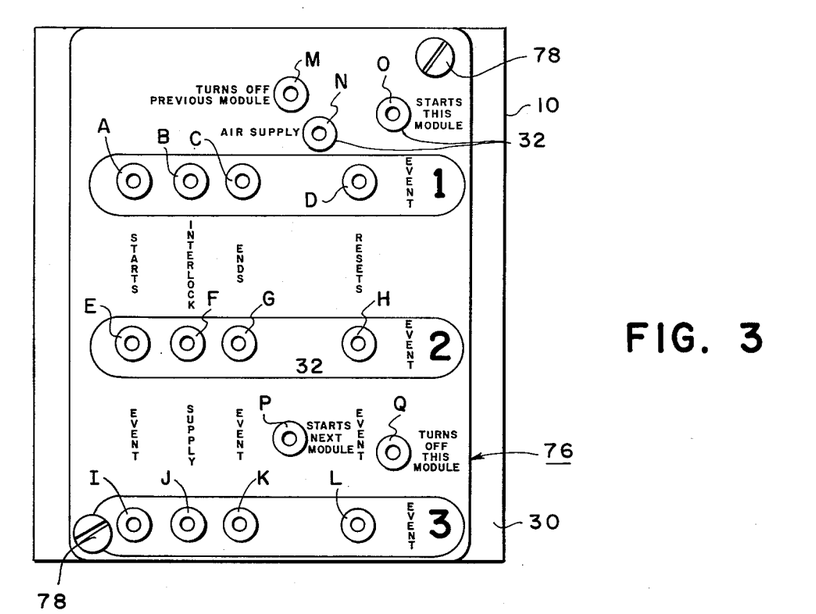
FIG. 3 is a back view of the module of FIG. 1.

Referring now to the drawings, a pneumatic logic module in accordance with the present invention is indicated generally by the reference numeral 10 in FIGS. 1-3. The module 10 comprises three pneumatic relay valves RV1, RV2 and RV3 which are mounted on a pneumatic circuit assembly 12. Each of the relay valves RV1-RV3 illustrated may be of the type manufactured by Dynamco, 2648 Brenner Drive, Dallas, Tex. 75220, and identified by part number L-DAO. This type of relay valve is illustrated schematically in FIG. 4.

Figure 4:
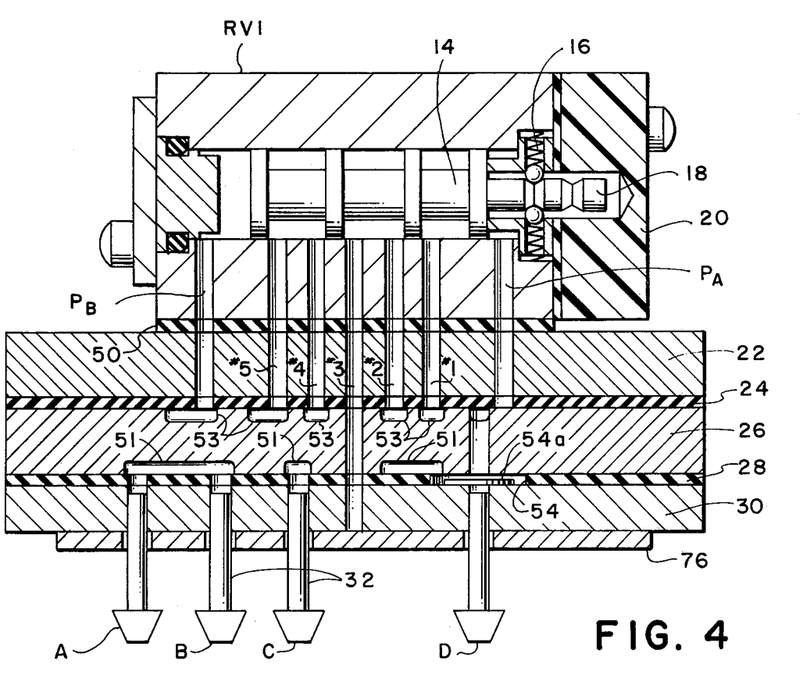
FIG. 4 is a simplified schematic sectional view taken along the axis of one of the relay valves of the module of FIG. 1.

The relay valve RV1, for example, illustrated in FIG. 4, includes a spool 14 which is shifted to the "normal" or "B" position which is illustrated by air applied to the pilot cavity $P_B$, and is piloted to the opposite end of the valve cavity by air pressure applied to the pilot cavity $P_A$, which position is referred to as the active or the "A" position. The valve spool 14 is preferably held in the normal and in the active positions by a ball and detent mechanism including spring biased ball 16 and a detent shaft 18. The end of the detent shaft is visible through a transparent cap 20 to provide a visual indication of the position of the spool 14. Each relay valve includes five ports #1-#5. In the module 10, the #3 port of each relay valve is continuously connected to atmosphere. When the valve spool 14 is in the normal position illustrated, a flow path from port #1 to port #2 is non-passing and port #2 communicates with port #3 and is therefore vented to atmosphere. This flow path is hereafter referred to as paths RV1a, RV2a and RV3a in FIG. 5. Ports #4 and #5 are in communication and these paths are referred to as the RV1b, RV2b, and RV3b paths in FIG. 5. On the other hand, when the valve 14 is shifted to the active position, the normally non-passing path between ports #1 and #2 are in communication, and the normally passing flow path between ports #4 and #5 is non-passing, with port #4 being vented to atmosphere through port #3.

The pneumatic circuit assembly 12 is comprised of a relay valve mounting plate 22, a valve mounting plate gasket 24, a circuit plate 26, a connector plate gasket 28 and a connector plate 30. The connector plate 30 includes a plurality of barbed connectors indicated collectively by the reference numeral 32. Each individual connector forms either an inlet or an outlet port for the module and are designated by alphabetical reference characters A–Q, as best illustrated in the bottom view of module 10 shown in FIG. 3, in accordance with the ports illustrated in the schematic circuit diagram of FIG. 5. The connectors 32 facilitate connecting the module 10 to other modules and to other components of the control circuitry by means of small plastic tubes merely telescopically pushed over the ends of the barbed connectors.

The modules are typically mounted on a hinged panel board in an enclosure with the relays and the indicators 18 visible, and with the connectors 32 protruding from the back of the panel so that the ports of the modules can be interconnected with tubing into a total control circuit.

Figure 5:
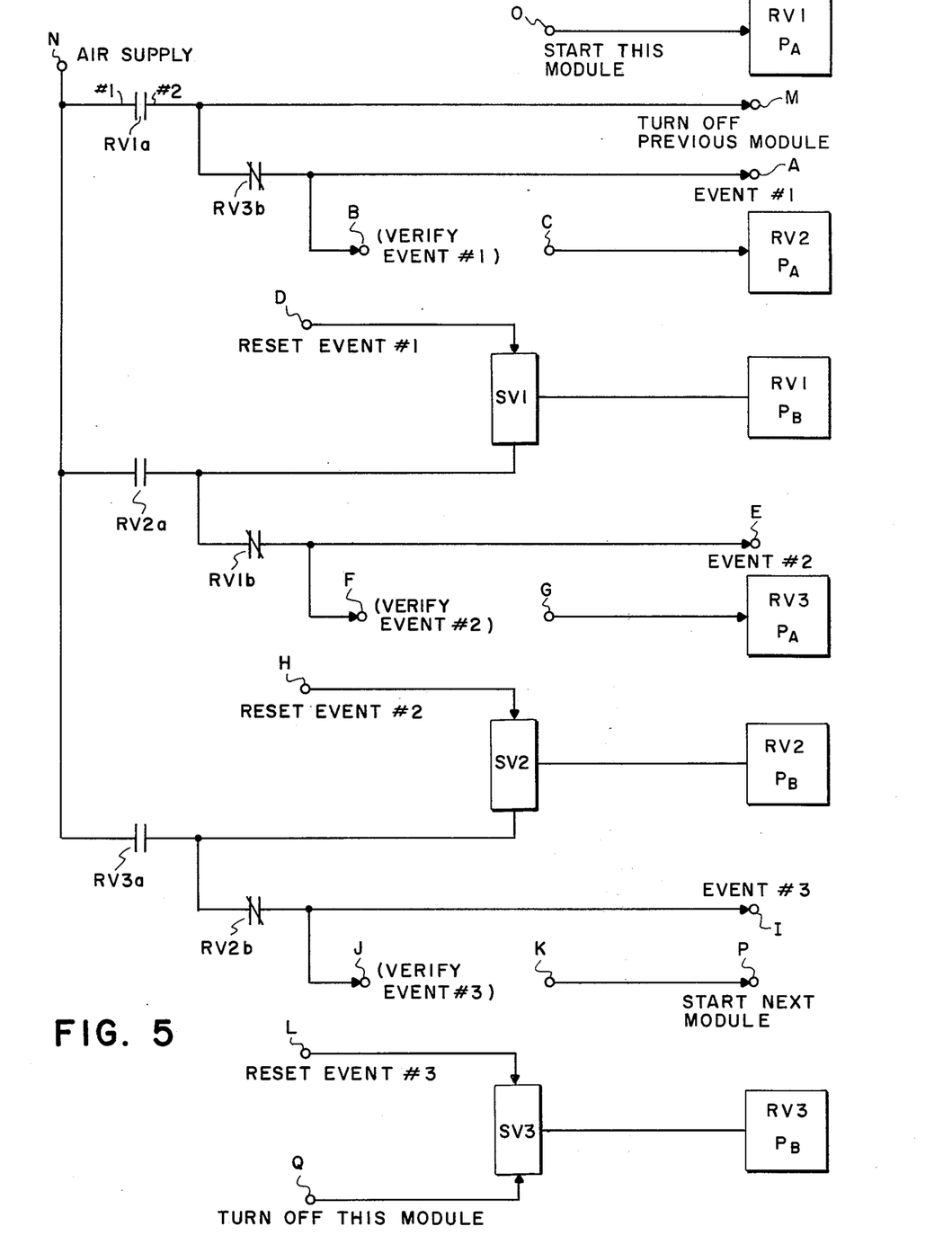
FIG. 5 is a schematic circuit diagram of the module of FIG. 1.

The circuit assembly 12 pneumatically interconnects the relay valves RV1–RV3 and the ports A–Q as illustrated in the schematic circuit diagram of FIG. 5. Port O is connected directly to pilot $P_A$ of relay valve $RV_1$ and is sometimes referred to as "Start This Module" port. A filtered air supply, between 10 and 150 psig, typically 50 psig, is applied to port N. The normally non-passing flow path RV1a of relay valve RV1 connects the air supply port N to port M, which may be referred to as the "Turn Off Previous Module" port. As previously mentioned, flow path RV1a is between ports #1 and #2 so that the flow path is passing when pilot $P_A$ is pressurized. It will be noted that when the spool 14 is shifted to the normal position illustrated in FIG. 4, that port #2, and therefore output M, are vented to atmosphere.

Flow path RV3b of relay valve RV3 is connected in series with flow path RV1a between the air supply port N and port A, which may be referred to as the "Event #1" port, and the pressure signal produced at port A is sometimes referred to as the Event #1 signal. Port B is common with port A and provides a convenient means for producing interlock pressure supply to a verification circuit which verifies that event #1 has been completed as will presently be described. Port C is connected to pilot cavity $P_A$ of relay valve RV2, and port C may be referred to as the interlock or verification return for event #1. A suitable verification circuit is connected between ports B and C to complete a flow path when the machine event initiated by the event pressure is completed. A typical verification circuit might be a limit valve which is actuated with a pneumatic piston or other mechanical device has reached a predetermined position, a proximity sensor, a temperature sensor, a time delay, or any other device or combination of devices which returns a pressure signal to port C. Port D is connected through a shuttle valve SV1 formed in the assembly 12 as will presently be described to the pilot chamber $P_B$ of relay valve RV1 and may be referred to as the "Reset" port for Event #1.

The air supply port N is also connected through flow path RV2a of relay valve RV2 to the shuttle valve SV1 and thence to pilot $P_B$ of relay valve RV1. The air supply is also connected through flow path RV2a and flow path RV1b of relay RV1 to port E, which provides a pneumatic pressure signal to start Event #2. Port F is common with port E and provides the pressure supply to enable a verfication circuit for Event #2, and port G receives the return verification pressure signal and applies it to pilot $P_A$ of relay valve RV3. Port H is connected by shuttle valve SV2 to pilot $P_B$ of relay valve RV2 and is the "Reset" port for Event #2.

Port N is connected by flow path RV3a and shuttle valve SV2 to pilot $P_B$ of relay valve RV2. Pressure is provided at port I to produce the pressure signal for Event #3 by flow paths RV3a of relay valve RV3 and RV2b of relay valve RV2. Port J is common with port I and provides the pressure output for the verification circuit for Event #3. Ports K and P are common and provide a convenient means for a user of the module to connect the return pressure signal from the Event #3 verification circuit to the start port O of the next module as will presently be described.

Port L, which may be referred to as "Reset" for Event #3 is connected through a shuttle valve SV3 to the pilot $P_B$ of relay valve RV3. Port Q which may be referred to as the "Turn Off This Module" port is also connected through shuttle valve SV3 to pilot $P_B$ of relay RV3. The operation of the circuit illustrated in FIG. 5 will hereafter be described in greater detail.

Figure 8:
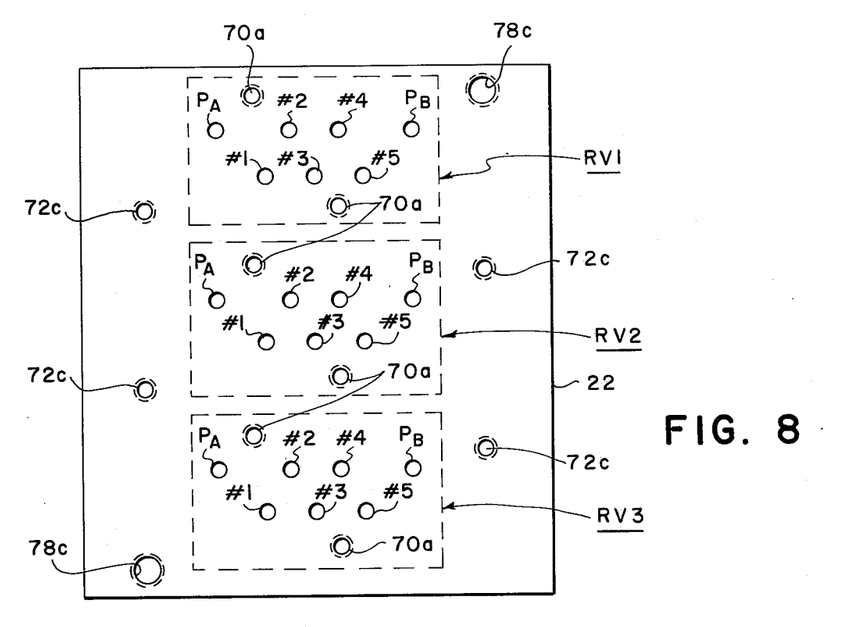
FIG. 8 is a scaled schematic view of the back side of the valve mounting plate of the module of FIG. 1.

As mentioned the circuit of FIG. 5 is formed by circuit assembly 12. The positions of the relay valves RV1–RV3 on the plate 22 are illustrated in dotted outline in FIG. 8. The location of the pilot ports $P_A$–$P_B$ and the active ports #1–#5 of the relay valve are illustrated in FIG. 8. A gasket having the same hole pattern is provided between each relay valve and the plate 22, the gasket 50 for relay valve RV1 being illustrated in the schematic sectional view of FIG. 4. It will be noted in the simplified view of FIG. 4 that all seven ports for the valve RV1 are illustrated as being in a straight line while in the actual embodiment the ports are staggered as illustrated in FIG. 8.

The gasket 24 disposed between the relay mounting plate 22 and the circuit plate 26 has the same hole configuration as the relay mounting plate 22 and accordingly is not illustrated in detail.

Figure 6:
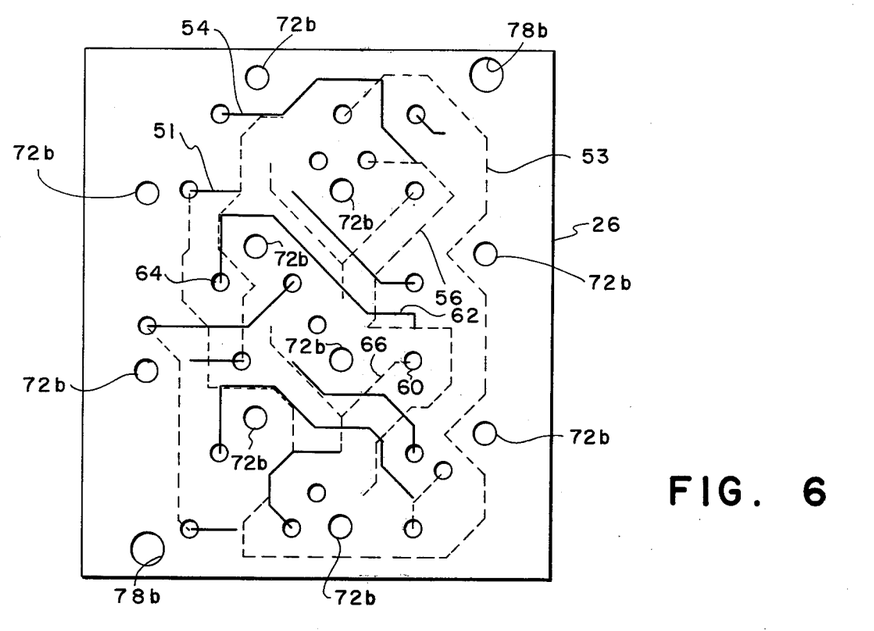
FIG. 6 is a scaled schematic view of the back side of the circuit plate used in the module of FIG. 1.
Figure 7:
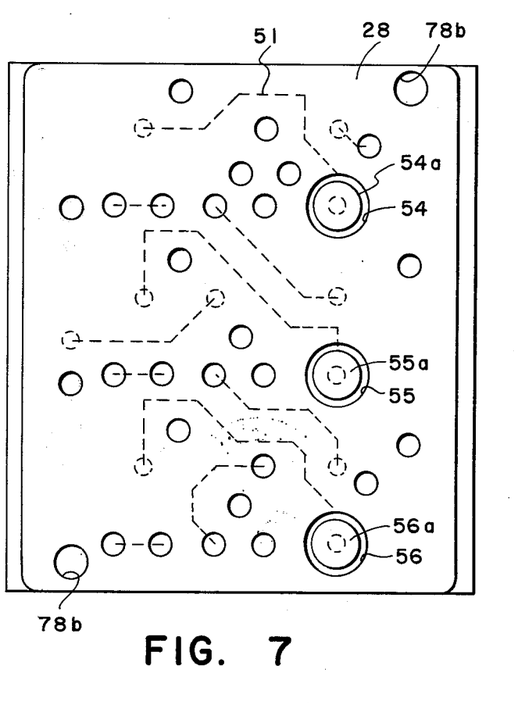
FIG. 7 is a scaled schematic view showing the rear gasket superimposed over the back face of a circuit plate illustrated in FIG. 6.
Figure 9:
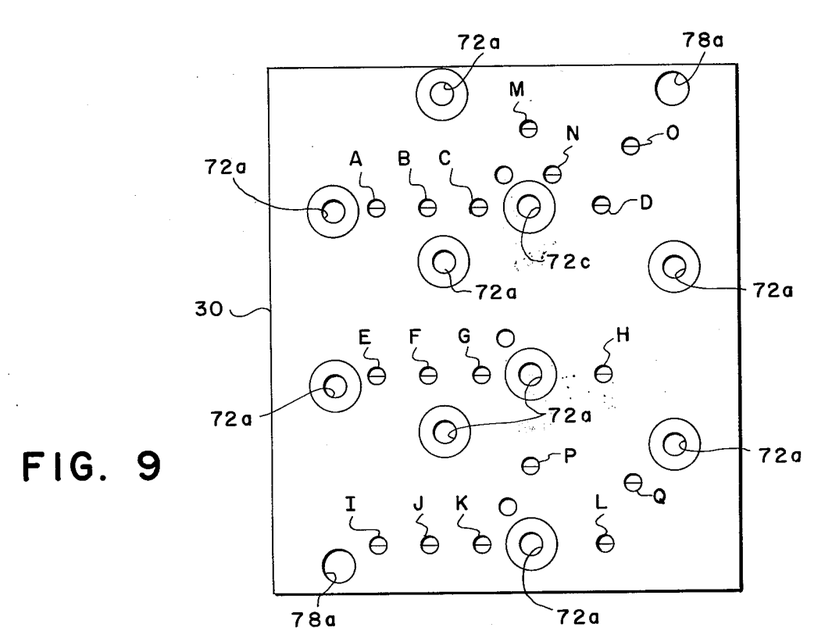
FIG. 9 is a scaled schematic view of the back side of the connector plate of the module of FIG. 1.

The circuit plate 26 is illustrated schematically in FIG. 6, which is a drawing to the same scale as FIGS. 7, 8 and 9. The circuit plate 26 has grooves in the back face, i.e., the face next to connector plate 30, which are shown by the solid lines, line 51, for example, and grooves on the front face, i.e., the surface nearest the valve plate 22, shown in dotted outline, for example, line 53. A number of bores form pneumatic passageways, and receive screws for interconnecting the assembly as will presently be described. The back face of the connector plate 30 is illustrated in FIG. 9 with bores in which the connectors 32 of the corresponding ports are mounted, designated by corresponding reference characters A–Q.

Figure 10:
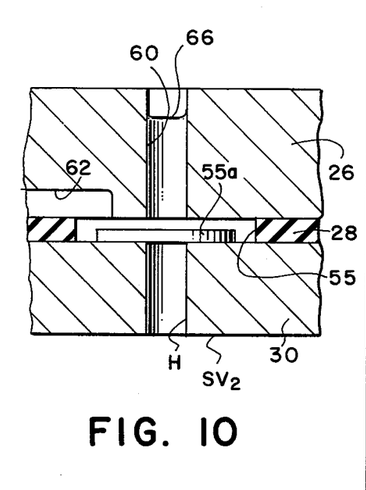
FIG. 10 is a simplified sectional view illustrating one of the shuttle valves of the module of FIG. 1.

The gasket 28 between the circuit plate 26 and the connector plate 30 has a hole pattern substantially the same as the plate 30, except for larger openings 54, 55 and 56 which are concentric with "Reset" ports D, H and L. Valve discs 54a, 55a and 56a are loosely disposed in the openings 54, 55 and 56, respectively, and have a thickness approximately one-half the thickness of the gasket 28, as best illustrated in the simplified sectional view of FIG. 10. The disc 54a–56a form the valve member of shuttle valves SV1–SV3 of FIG. 5. Shuttle valve SV2 is illustrated in FIG. 10, which is a sectional view showing portions of the circuit plate 26, the gasket 28, and the connector plate 30 taken along the axis of port H, which is the "Reset Event #2" port. Port H in plate 30 is substantially aligned with a bore 60 in the plate 26. The edge of the cavity formed by the opening 55 in the gasket 28 connects with routed groove 62 in the back face of circuit plate 26. As a result, when air pressure is applied on port H, the air flow forces disc 55a upwardly to cover bore 60, thus providing a pneumatic flow path from port H to groove 62, which ultimately leads to bore 64 (see FIG. 6) which in turn communicates with pilot cavity $P_B$ of relay valve RV2. Bore 60 communicates with a groove 66 routed in the front surface of the plate 26 which extends to port #2 of valve RV3 and to port #5 of valve RV2. Conversely, air pressure from groove 66, which comes from port #2 of relay valve RV3 will force the disc 55a downwardly to seal port H allowing air to pass from port 60 to routed groove 62 and thus to pilot cavity $P_B$ of relay valve RV2.

No attempt will be made to trace the other specific flow paths in the assembly 12 forming the circuit illustrated in FIG. 5, although the components illustrated in FIGS. 6–10, together with the gasket 24 do provide this circuit.

The relay valves RV1, RV2 and RV3 are connected to the valve mounting plate 22 by screws 70 passed through the bores in the valve bodies and threaded into the front portions of tapped bores 70a in the valve mounting plate 22. The plates 22, 26 and 30 and the gaskets 24 and 28 disposed therebetween are interconnected by screws (not illustrated) passed through bores 72A in the connector plate 30, bores 72b in the circuit plate 26 and threaded into the rear portions of tapped bores 70a and into tapped bores 72c in valve mounting plate 22. It will be noted that the tapped bores 70a are used for both the screws 70 and the screws passed from the connector plate 30, the screws being of such lengths as not to interfere in the tapped bore 70a.

A silk screened instruction plate 76 (see FIGS. 2, 3 and 4) is mounted on the back of connector plate 30 by screws 78 which pass through bores 78a in plate 30, bores 78b in plate 26 and are threaded into tapped bores 78c in plate 22. The screws 28 may also be used to mount the entire module 10 on a suitable panel board, the panel board preferably being disposed between the larger plate 76 and the connector plate 30 so as to readily present instructions to service technicians.

It will be noted that the plate 76 is disposed over the screws which hold the assembly together and is also disposed over the bores aligned with the #3 ports of the relay valves which vent the #3 ports to atmosphere, but the plate 76 is not sealed to the connector plate so that the atmospheric vents are not closed.

OPERATION

Assume that only one of the modules 10 is to be used to produce three successive events. Port M would then be preferably connected directly to port Q, by a jumper tube, and port P would be connected directly to port O through a suitable cycle initiating device such as a push button valve. Port N would, of course, always be connected to an air supply. In the preferred mode of operation, the last relay valve in the series, relay valve RV3 when only one module is used, is preset to the active position by a pressure pulse applied through an external shuttle valve to the return verification port and all other relay valves reset to the normal position. The air supply port N must be vented during this phase of operation to permit all relay valves to be shifted. Alternatively, an initial start pulse signal can be applied through a shuttle valve (not illustrated) to port O to shift the spool of relay valve RV1 to the active position. Then flow path RV1a would become passing and air pressure would pass from port M to port Q and shuttle valve SV3 to pilot $P_B$ of relay valve RV3 to assure that valve RV3 is switched to the normal condition. Subsequent operation is the same in either mode, so that pressure at port I is vented to atmosphere and so that pressure is produced at port A. Additionally, flow path RV1b would be switched to non-passing to ensure that port E is vented to atmosphere. As a result, only Event #1 is active. The pressure signal on port A is also applied to port B which provides pressure for the verification circuit for Event #1.

When Event #1 has been completed, pressure is returned through the verification circuit to port C and is applied to pilot $P_A$ of relay valve RV2. thereby shifting relay valve RV2 to the active position. As a result, flow path RV2a becomes passing so that air pressure passes through shuttle valve SV1 to pilot $P_B$ of relay RV1, returning the spool of relay RV1 to the normal position. This causes flow path RV1a to again become non-passing, and also vents the pressure at ports M, A and B to atmosphere since flow path RV3b is also passing. After relay valve RV1 has shifted to the normal position, flow path RV1b is again passing, thus enabling high pressure air to be applied to ports E and F to initiate Event #2 and provide an air supply for the verification circuit for Event #2. It will also be noted that when relay RV2 was shifted to the active position, flow path RV2b became non-passing and vented port I to atmosphere to assure that Event #3 could not occur. Thus, it will be noted that both Events #1 and #3 are positively locked out during Event #2.

When pressure is returned to port G by the verification circuit for Event #2, the pilot $P_A$ of relay valve RV3 is pressurized to shift relay RV3 to the active position. This causes flow path RV3a to pass supply air pressure through shuttle valve SV2 to pilot $P_B$ of relay valve RV2, shifting relay valve RV2 back to the normal position. This causes flow path RV2a to become non-conducting and vents port E to atmosphere thus locking out Event #2 and simultaneously initiating event #3 through flow path RV2b to provide a pressure signal at ports I and J.

When pressure returns from the verification circuit for Event #3 and through port K, pressure at port P enables the push button valve, or other start device connected between port P and port O for the module. Since port M is connected to port Q, the spool of relay valve RV3 will remain in the active position even though Event #3 has been completed preparatory to the next cycle. Then when the pushbutton is again actuated, the pressure at port P resulting from the completion of the verification circuit for Event #3 is applied to pilot $P_A$ of RV1 to again initiate a cycle.

On the second and subsequent cycles, the pressure signal for event #1 at port A occurs after relay valve RV3 has been reset to the normal position by air pressure from port M to port Q and through shuttle valve SV3 to pilot $P_B$ of relay valve RV3. The above cycle will be repeated each time the start button is pressed to transfer pressure from port P to port O after the verification circuit for Event #3 has transferred pressure to port P.

An alternative method for operating a single module, or for terminating operation of the last of a series is to connect port P to port Q, rather than port O. A pressure pulse is then provided to the starting port O from the air supply by a suitable push button valve or other device. The sequence of operation is the same as previously described except that relay valve RV3 is reset to the normal position by pressure returned to port K by the verification circuit for Event #3. This "self-kill" mode of operation is possible when using detent relay valves which require a predetermined pressure level in the pilot $P_B$ before the valve spool can shift. Since the opposite pilot $P_A$ of relay valve RV3 is vented through flow path RV1b and non-passing flow path RV2a to atmosphere, the valve is shifted out of the active detent position with sufficient inertia to reach the normal detent position before the closing of flow path RV3a can prevent the shift. In this mode of operation, all three relays return to the normal position at the end of a cycle, and none of the event outputs A, E, or I is active. If desired the sequence of events can recycle automatically by connecting port P directly to port O and using an interruption in one of the event verification circuits to stop the cycle systematically or on an emergency interrupt basis.

When one or more additional modules 10 are to be cascaded in series, port P of each preceeding module is connected to port O of the succeeding module, and port M of each succeeding module is connected to port Q of the preceeding module. Of course, ports M, Q, P, and O, the first and last modules, are interconnected as described above in the operation of a single module, depending upon the mode of operation desired. The sequence of operation is then identical to that previously described except that any desired number of successive events are produced, instead of only three.

Ports O, P, M and Q may be connected to the appropriate ports of any number of succeeding or preceeding modules to provide a fan-out or fan-in for combination series and parallel systems. For example, parallel series of modules can be merged into a single start port O by either pneumatic AND or OR logic device. Pneumatic logic circuits also premit nested loops in a series to accomplish substantially any logic program which can be performed by a digital computer.

The module 10 can be used in a wide variety of applications. The verification circuit interposed between any verification output port and verification return port can include one or more limit valves, time delays, proximity sensors, temperature sensors, or any device or combination of devices that will allow air to pass when the designated event has in fact been completed. Of particular significance is that anyone of the stages of the module can be used as a time delay relay merely by providing a suitable throttling flow control and volume chamber in the verification circuit, since the detented relay valves require a predetermined minimum pressure to overcome the spring detent system.

From the above description, it will be appreciated that the module is fail safe in operation in that only one relay valve can be shifted to the active position at one time, and that a pressure signal can be produced at only one event at a time. For example, when relay valve RV1 is shifted to the active position, no pressure is applied to port A to initiate Event #1 unless relay valve RV3 is in the normal position to cause path RV3b to be passing. Event #2 is precluded because flow path RV1b is non-passing and vents port E to atmosphere when relay valve RV1 is in the active position. The preceeding module in a series is held inactive by pressure on port M which holds relay valve RV3 of the previous module in the normal position. Conversely, the proceeding module prevents initiation of the succeeding module until port P has been pressurized.

It will also be noted that no succeeding event can occur without a verification that a preceeding event has been completed, including the resetting of the preceeding relay valve. For example, so long as the loop is completed by supplying pressure from port P back to port O as a result of a verification that the last event in the series has occurred during the last cycle, the sequence in response to a start up is as follows. A pressure signal for Event #1 cannot occur until flow path RV3b is passing, thus verifying that relay valve RV3 is in the normal position. Event #1 cannot be terminated until a verification signal is provided at port C signifying that Event #1 has been completed, and also that flow path RV1b is again passing, verifying that relay valve RV2 has, in fact, been shifted to the active position. Only then can a pressure signal occur at port E to start Event #2. Similarly, Event #2 is not terminated until it is determined that Event #2 has been completed by a verification pressure signal at port G, and that valve RV3 has also been shifted to the active position. Event #3 cannot occur until there is verification that valve RV2 has been reset to the normal position to vent port E to atmosphere, terminating Event #2. This complete verification is provided for any number of modules cascaded in series.

The mode of operation described above where only one relay can be in an active position at any time, barring mechanical separation of a spool, provides for instantaneous "de-bugging" of a stalled complex circuit merely by observing which of the indicators 18 is not in view. This would indicate which event has not been completed by a return pressure signal from the verification circuit, or would indicate which relay valve is defective. This is of immense importance in complex circuits. As previously mentioned, any one or all of the relay valves can be individually or collectively reset to the normal position by applying a momentary pressure signal to the reset ports D, H and L, thus pressurizing pilots $P_B$ of the three valves RV1-RV3, through shuttle valves SV1-SV3. In addition, the module can be preset to any desired event by applying a momentary pressure signal through a shuttle valve external to the module to the verification return ports O, C or G. The presetting of a selected relay valve should be performed only when the air supply at port N is absent and simultaneously all other relay valves should also be reset.

In accordance with an important aspect of the invention, the module should include three relay valves interconnected as shown in FIG. 5 in order to prevent a possible race condition when only two events are provided but only one event is to be used. Additional relay valves can be provided in the module as desired, although cascading of a plurality of standard modules each having three relay valves is more economical. When using the module to produce less than three events, any desired event or events may be omitted merely by blocking the event output port, for example, port E, and short circuiting the verification circuit ports F and G with a jumper tube. As a result, the module would cycle through event #2 in a fraction of a second.

The circuit board of module 10 is of a very simple and economical construction. A low cost, highly reliable, shuttle valve is provided as an integral part of the circuit for the reset event. If desired, "preset" ports and shuttle valves could be provided where "preset" capability is desired in parallel with verification return ports O, C, and G. Because of the manner in which the relays are mounted using screws 70, a defective relay can be replaced without disassembling the entire module or disconnecting the module from the remainder of the circuit. The module board is connected with connections 32 for all of the ports to facilitate utilization of a number of the modules in a complex circuit.

Although preferred embodiments of the invention have been described in detail, it is to be understood that various changes, substitutions and alterations can be made therein without departing from the spirit of the invention as defined by the appended claims.

What is claimed is:

1. A pneumatic logic control module comprising:
   first, second and third pneumatic relay valves each having first and second pilots which shift respective first, second and third valve spools into normal and active positions, respectively, when pressurized,
   each relay valve including a first pneumatic flow path which is non-passing when the spool is in the normal position and passing when the spool is in the active position, and a second pneumatic flow path which is passing when the spool is in the normal position and non-passing when the spool is in the active position,
   first, second and third "start event" pneumatic outlet ports,
   first, second and third "verification" pneumatic outlet ports,
   first, second and third "verification return" pneumatic inlet ports,
   a "turn off previous module" pneumatic outlet port,
   a "start next module" pneumatic outlet port,
   a "start this module" pneumatic inlet port,
   a "turn off this module" pneumatic inlet port,
   a pneumatic supply inlet port, and
   pneumatic circuit means for
      connecting the "start this module" inlet port to the second pilot of the first valve for shifting the first valve spool to the active position in response to a pressure signal applied to the "start this module" pneumatic inlet port,
      connecting the pneumatic supply inlet port through the first flow path of the first relay valve to the "turn off previous module" pneumatic outlet port,
      connecting the pneumatic supply inlet port through the first flow path of the first relay valve and the second flow path of the third relay valve to the first "start event" pneumatic outlet port and to the first "verification" pneumatic outlet port,
      connecting the first "verification return" pneumatic inlet port to the second pilot of the second relay valve,
      connecting the pneumatic supply inlet port through the first flow path of the second relay valve to the first pilot of the first valve,
      connecting the pneumatic supply inlet port through the first flow path of the second relay valve and the second flow path of the first relay valve to the second "start event" pneumatic outlet port and to the second verification pneumatic outlet port,
      connecting the second "verification return" pneumatic inlet port to the second pilot of the third relay valve,
      connecting the pneumatic supply inlet port through the first flow path of the third relay valve to the first pilot of the second relay valve,
      connecting the pneumatic supply inlet port through the first flow path of the third relay valve and the second flow path of the second relay valve to the third "start event" pneumatic outlet port and to the third "verification" pneumatic outlet port,
      connecting the third "verification return" pneumatic inlet port to the "start next module" pneumatic outlet port, and
      connecting the "turn off this module" pneumatic inlet port to the first pilot of the third relay valve.

2. The control module of claim 1 further comprising visual indicator means for visually indicating the position of each valve spool.

3. The control module of claim 1 wherein the pneumatic circuit means is formed by a circuit assembly, a plurality of parallel flat plate members having pneumatic flow paths formed by grooves formed in at least one surface of the plates and bores extending through the plates.

4. The control module of claim 3 wherein the relay valves are mounted on one face of the circuit assembly and the pneumatic outlet and inlet parts are disposed on the opposite parallel face of the circuit assembly.

5. The control module of claim 4 further comprising visual indicator means for visually indicating the position of each valve spool.

6. The control module of claim 3 wherein the circuit assembly comprises a layered structure including in series a connector plate, a connector plate gasket, a circuit plate, a valve mounting plate gasket, and a valve mounting plate, the relay valves being mounted on the valve mounted plate, the pneumatic inlet and outlet ports being formed by barbed connectors extending from the connector plate, and flow paths being formed by grooves in the opposite faces of the circuit plate.

7. The control module of claim 1 further comprising:
   first, second, and third pneumatic "reset" inlet ports, and wherein the pneumatic circuit means includes
   first, second and third shuttle valves connecting the respective first, second and third "reset" inlet ports to the first pilots of the respective first, second and third relay valves.

8. The control module of claim 7 wherein:
   the pneumatic circuit means includes first and second plates disposed on opposite sides of a gasket and wherein
   each shuttle valve is formed by an opening in the gasket to form a valve cavity between the plates, a disc disposed in the valve cavity having a thickness less than the thickness of the gasket, a first bore in the first plate communicating with the interior of the cavity at one face of the disc, and a second bore in the second plate communicating with the interior of the cavity at the other face of the disc, and a passageway formed in one of the plates communicating with the cavity at the edge of the disc whereby the bores form pneumatic inlet ports to the cavity and the passageway forms a pneumatic outlet port.

9. A pneumatic logic control module comprising:

first, second and third pneumatic relay valves each having first and second pilots which shift respective first, second and third valve spools into normal and active positions, respectively, when pressurized, each relay valve including a first pneumatic flow path which is non-passing when the spool is in the normal position and passing when the spool is in the active position, and a second pneumatic flow path which is passing when the spool is in the normal position and non-passing when the spool is in the active position, first, second and third "start event" pneumatic outlet ports, first, second and third "verification return" pneumatic inlet ports, a "turn off previous module" pneumatic outlet port, a "start this module" pneumatic inlet port, a "turn off this module" pneumatic inlet port, a pneumatic supply inlet port, and pneumatic circuit means for connecting the "start this module" inlet port to the second pilot of the first valve for shifting the first valve spool to the active position in response to a pressure signal applied to the "start this module" pneumatic inlet port, connecting the pneumatic supply inlet port through the first flow path of the first relay valve to the "turn off previous module" pneumatic outlet port, connecting the pneumatic supply inlet port through the first flow path of the first relay valve and the second flow path of the third relay valve to the first "start event" pneumatic outlet port, connecting the first "verification return" pneumatic inlet port to the second pilot of the second relay valve, connecting the pneumatic supply inlet port through the first flow path of the second relay valve to the first pilot of the first valve, connecting the pneumatic supply inlet port through the first flow path of the second relay valve and the second flow path of the first relay valve to the second "start event" pneumatic outlet port, connecting the second "verification return" pneumatic inlet port to the second pilot of the third relay valve, connecting the pneumatic supply inlet port through the first flow path of the third relay valve to the first pilot of the second relay valve, connecting the pneumatic supply inlet port through the first flow path of the third relay valve and the second flow path of the second relay valve to the third "start event" pneumatic outlet port, and connecting the "turn off this module" pneumatic inlet port to the first pilot of the third relay valve.

10. A pneumatic logic control module comprising:

at least first and second valving means each having spool means shiftable between normal and active positions, and pneumatic circuit means cooperating with the spool means for shifting the first spool means from the normal position to the active position in response to a first pressure input signal to produce a first pressure output signal at a first outlet port which can be used to start a first event external to the module and for preventing a pressure signal from reaching a second outlet port, and shifting the second spool means from the normal position to the active position in response to a first verification pressure input signal to shift the first valving means back to the normal position to terminate the first pressure output signal and to produce a second pressure signal at the second outlet port which can be used to start a second event external to the module.

11. The control module of claim 10 wherein there are at least three valve spool means and the pneumatic circuit means includes means for successively shifting the spool means from the normal position to the active position in response to successive verification pressure input signals to shift the preceding spool means back to the normal position to terminate the previous pressure signals and to produce successive pressure signals at a corresponding number of outlet ports.

* * * * *